United States Patent [19]

Schnatmeyer et al.

[11] 4,027,695
[45] June 7, 1977

[54] CHECK VALVE

[75] Inventors: Hans Schnatmeyer, Bremen; Gerhard Schützer, Stuhr-Moordeich, both of Germany

[73] Assignee: Gustav F. Gerdts KG, Bremen, Germany

[22] Filed: May 10, 1976

[21] Appl. No.: 684,706

[30] Foreign Application Priority Data

July 4, 1975 Germany .......................... 2529910

[52] U.S. Cl. .................................. 137/527; 251/337
[51] Int. Cl.² .......................................... F16K 15/03
[58] Field of Search ............ 137/527, 527.2, 527.4, 137/527.6, 527.8; 251/337

[56] References Cited

UNITED STATES PATENTS

| | | | |
|---|---|---|---|
| 1,266,130 | 5/1918 | Kimbler | 137/527 |
| 2,928,416 | 3/1960 | Balhouse | 137/527.8 |
| 3,498,322 | 3/1970 | Gilliam | 137/527.6 X |
| 3,509,908 | 5/1970 | Latham et al. | 137/527.4 |
| 3,604,453 | 9/1971 | Boitnott | 137/527 |
| 3,933,173 | 1/1976 | Kajita | 137/527.8 |
| 3,955,592 | 5/1976 | Guyton | 137/527.4 X |

Primary Examiner—William R. Cline
Attorney, Agent, or Firm—Allison C. Collard

[57] ABSTRACT

A check valve controlled by the medium passing through comprising: a housing having an input opening on one side defining a valve seat and an output opening communicative with the input opening, a locking member disposed over the input opening of the valve seat and positioned on the seat, the locking member having a pivot axis at one end, a bearing cap mounted in and engaging the walls of the discharge opening, the cap having a pair of bearing side plates formed at one end, the side plates having lateral recesses formed therein for receiving the pivot axis of the locking member. There is also a spring coupled to the housing for urging the locking member against the valve seat.

8 Claims, 3 Drawing Figures

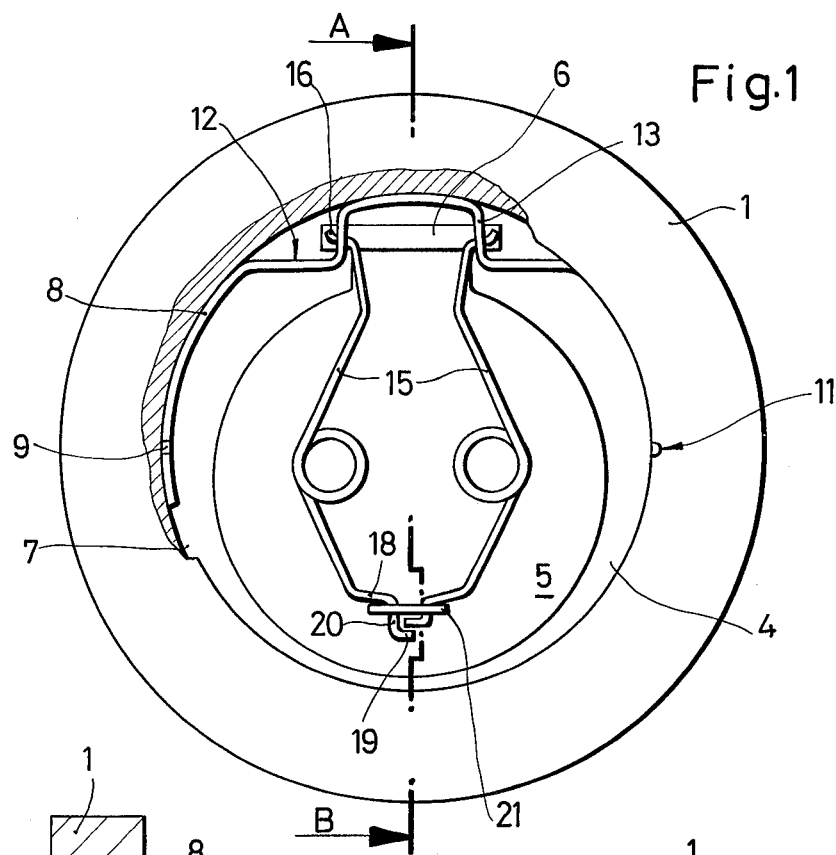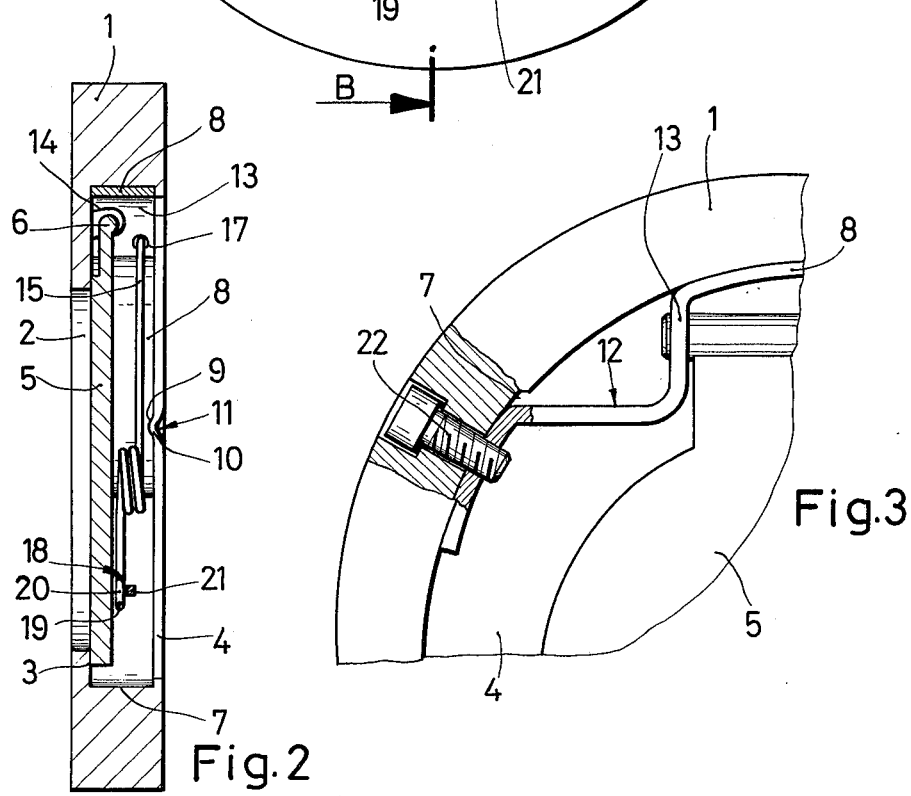

CHECK VALVE

The present invention relates to a check valve having a locking member disposed on a valve seat and an improved bearing cap.

More specifically, this invention relates to a check valve which provides a receiving bearing for the locking member of the check valve which avoids the use of expensive castings for the valve housing and the receiving bearing. It has been found desirable to manufacture the valve housing in the form of a simple and inexpensive piece. Simultaneously, tight tolerances and the expensive press fit between the valve housing and the receiving bearing should be avoided, and the device should be manufactured so that it can be easily assembled.

The cap which forms the receiving bearing, among other things, can be easily and inexpensively manufactured as a stamped metal part made from commercially available semi-finished parts, preferably having a rectangular cross section. Due to its required lower radial thichness, the bearing cap has a sufficient radial flexibility, so as to compensate for cross sectional fluctuations in size of the housing discharge conduit, a feature which would save expenses.

With respect to the shape of the valve housing, the cap does not require any specific dimensions. Hence, the valve housing may be constructed as a simple turned part.

The bearing cap can be axial positioned or adjusted in the valve housing. The bearing cap can also be retained rigidly and securely in the valve housing in view of its inherent radial flexibility. There is also a means provided for reliably securing the bearing cap against turning in the valve housing. Frequently, in these types of check valves, the inlet conduit and the discharge conduit of the housing are eccentrically positioned with respect to each other, so that a relatively large opening angle of the locking member is obtained. In these embodiments a twisting or turning of the bearing cap and thereby a twisting or turning of the locking member around the longitudinal axis of the discharge conduit would result in an eccentric displacement of the locking member with respect to the valve seat. A tight sealing would then not be assured. In these cases the assurance against turning or twisting is of particular importance.

For short structured disk-like valve housing wherein the length of the discharge conduit exceeds the width of the bearing cap by only a small amount, it is possible now to prevent turning or twisting with an inexpensive solution.

In a further embodiment, the bearing cap is retained in the valve housing so that the cap has an annular arc of less than 180° C. This avoids a radial snap-ring compression of the bearing cap for assembly and disassembly. This is particularly advantageous in check valves having a larger nominal width with a necessarily stiffer bearing cap. There are also provided advantageous recesses in the cap bearing for the pivot axis of the locking member.

There are further advantageous features wherein the bearing cap acts as an abutment for one or a plurality of valve springs. The spring mounting at the opening side of the locking member prevents in a simple and effective manner, a tilting or turning movement of the valve springs and their associated longitudinal axis.

Other objects and features of the present invention will become apparent from the following detailed description when taken in connection with the accompanying drawing which discloses several embodiments of the invention. It is to be understood that the drawing is designed for the purpose of illustration only, and is not intended as a definition of the limits and scope of the invention.

In the drawing, wherein similar reference numerals denote similar elements throughout the several views:

FIG. 1 is a plan view of the inventive check valve with a partly sectional view;

FIG. 2 is a sectional view of the check valve taken along line A-B of FIG. 1 along A-B; and FIG. 3 is a segmented view of a further embodiment of the inventive check valve in plan view.

Referring to FIGS. 1 and 2, there is shown a flat disk-shaped valve housing 1 with an inlet conduit 2 which discharges into a valve seat 3 and with a subsequent step-like expanded discharge conduit 4. A locking member 5 is provided in discharge conduit 4 for cooperation with valve seat 3 and is pivotably retained on a pivot axis 6.

Discharge conduit or outlet 4 is provided with a circumferentially running receiving groove 7, wherein a bearing cap 8 is inserted which acts as a pivot bearing for locking member 5. Bearing cap 8 is made from a stamped metal part of a rectangular cross sectional rod material. To insert bearing cap 8, which extends in annular arc of more than 180° into discharge opening 4, the cap is radially compressed like a snap ring, so that it can then securely engage into receiving groove 7 due to its inherent tension and radial flexibility. In order to prevent twisting, bearing cap 8 is provided with two radial grooves 9 along the front edge of the discharge side which engage safety shoulders 10 provided at the shank of receiving groove 7. These safety shoulders are provided by recesses 11 formed on the discharge side of the front housing wall surface.

Bearing cap 8 is provided between its ends with two radially inwardly directed bends 12 for pivotably mounting locking member 5. These bends are provided with two parallel side-by-side arranged segments which run lateral with respect to the pivot axis 6. The segment acts as a side plate bearing 13 for pivot axis 6 and for this purpose are provided with one recess each to receive the axial ends. These two recesses are in form of open grooves facing the front surface of cap 8 which is located on the side of the valve seat. Furthermore, bearing cap 8 acts as an abutment bearing on the housing side for two shank springs 15, whereby their ends at the housing side are Z-shaped. The Z-ribs 16 are rotatably mounted in retaining bores 17 which are provided parallel with respect to pivot axis 6 in bearing side plates 13.

On the opposite side of the locking member, the spring ends of shank springs 15 are also bent in a step-like manner into two segments 18 and 19 which run laterally with respect to the longitudinal axis of the springs. Connecting segments 20 run in the direction of the longitudinal axis of the springs. Segment 20 extends axially into a two apertured eyelet 21 which is provided in locking member 5, while section 18 engages with its front face the retaining eyelets. Furthermore, segments 18 and 19 radially engage locking member 5 (FIG. 2). This prevents an outward pivoting of shank springs 15 from their operating position which is parallel with respect to locking member 5.

In the embodiment shown in FIG. 3, bearing cap 8 is retained in valve housing 1 by means of radially arranged mounting screws 22. This permits bearing cap 8 to be retained in an annular arc which is less than 180°. Such a constructed bearing cap 8 may be assembled and disassembled without a further snap ring-like compression in an annular manner. The only step required is to displace bearing cap 8 towards the conduit center, so that the cap can be removed from receiving groove 7 and removed from discharge conduit 4.

The radial depth of receiving groove 7 may be less than the thickness of the bearing cap as shown in FIG. 3. On the other hand, the depth of the groove and the thickness of the bearing cap may be equal as is the case for example in the embodiment of FIGS. 1 and 2. Finally, in the embodiment of FIG. 3, the receiving groove 7 may be eliminated altogether. The radial depth of receiving groove 7 may be reduced as in FIG. 3 and the thickness of the bearing cap may be the same as shown in FIGS. 1 and 2. However, in the embodiment shown in FIG. 3, receiving groove 7 may be eliminated altogether.

While only several embodiments of the present invention have been shown and described, it will be obvious to those skilled in the art that many changes and modifications may be made thereunto without departing from the spirit and scope of the invention.

What is claimed is:

1. A check valve controlled by the medium passing through comprising:
    a valve housing (1) having an inner surface defining an inlet channel (2) and discharge channel (4) communicative with said inlet channel and joined thereto by a radially inwardly directed shoulder which defines a valve seat (3), said discharge channel having a circumferential receiving groove (7) formed therein;
    a locking member (5) disposed over the inlet channel and positioned interiorly thereof adjacent said valve seat and including means for pivotably mounting said locking member (6) for cooperative engagement with said valve seat; and
    a generally C-chaped resilient mounting yoke (8) disposed substantially within said receiving groove of said discharge channel and in biased engagement therewith, said yoke extending over an annular arc of more than 180°, and having two radially-inwardly extending bend portions (12) formed therein adjacent its central portion which define two opposed shank segments (13), said shank segments having lateral recesses (14) formed therein for receiving the pivotable mounting means of said locking member.

2. A check valve controlled by the medium passing through comprising:
    a valve housing (1) having an inner surface defining an inlet channel (2) and discharge channel (4) communicative with said inlet channel and joined thereto by a radially inwardly directed shoulder which defines a valve seat (3), said discharge channel having a circumferential receiving groove (7) formed therein;
    a locking member (5) disposed over the inlet channel and positioned interiorly thereof adjacent said valve seat and including means for pivotably mounting said locking member (6) for cooperative engagement with said valve seat;
    a generally C-shaped resilient mounting yoke (8) disposed substantially within said receiving groove of said discharge channel and in biased engagement therewith, and said yoke extending over an annular arc of more than 180°, and having two radially-inwardly extending bend portions (12) formed therein adjacent its central portion which define two opposed shank segments (13), said shank segments having lateral recesses (14) formed therein for receiving the pivotable mounting means of said locking member; and
    spring means coupled to said housing for urging said locking member against said valve seat.

3. The check valve according to claim 2 wherein the leading edge of said mounting yoke opposite said valve seat includes at least one radial groove (9) and said circumferential receiving groove (7) has at least one corresponding, mating securing shoulder (10) for engaging said radial groove and retaining said yoke against turning.

4. The check valve according to claim 3 wherein said at least one securing shoulder is formed by a generally concave shaped recess (11) formed in the inner surface of the valve assembly.

5. The check valve according to claim 2 wherein said recesses formed in said shank segments of said mounting yoke are formed as open grooves on the leading edge of said shank segments adjacent said valve seat.

6. The check valve according to claim 5 wherein said mounting yoke serves as a bearing abutment for said spring means and said spring means comprises at least one shank spring (15) which is retained on said mounting yoke and which is biased against said locking member and extends in a generally normal direction relative to said central portion of said yoke.

7. The check valve according to claim 6 wherein one end of said at least one shank spring is generally Z-shaped (16) and wherein at least one of shank segments of said mounting yoke has a lateral retaining bore formed therein (17) for rotatably receiving said Z-shaped end of said spring.

8. The check valve according to claim 7 wherein the opposite end of said shank spring has a step-like shape which defines two segments (18, 19) which extend in a direction transverse to the longitudinal spring axis and a connecting segment (20) which interconnects said two segments (18, 19) and extends in a direction generally normal thereto, and wherein said locking member has a retaining loop (21) on its surface opposite said valve seat for receiving said connecting section (20) of said end of said spring and for holding said two segments (18, 19) flatly against said surface of said locking member.

* * * * *